United States Patent [19]

Wunsch

[11] 4,106,524
[45] Aug. 15, 1978

[54] LOW ACTUATION FORCE FLUID VALVE APPARATUS

[75] Inventor: Walter G. Wunsch, Erie, Pa.

[73] Assignee: Geosource Inc., Houston, Tex.

[21] Appl. No.: 709,172

[22] Filed: Jul. 27, 1976

[51] Int. Cl.² .................................................. F16K 7/18
[52] U.S. Cl. ........................ 137/625.44; 251/DIG. 2;
137/202; 137/269
[58] Field of Search ........................ 251/DIG. 2, 176;
137/625.28, 625.44, 411, 202

[56] References Cited

U.S. PATENT DOCUMENTS

| | | | |
|---|---|---|---|
| 212,556 | 2/1879 | Johnson | 137/625.3 X |
| 2,768,644 | 10/1956 | Crawford | 137/625.28 X |
| 3,782,406 | 1/1974 | Siebold | 251/DIG. 2 |
| 3,902,525 | 9/1975 | Hutson | 251/DIG. 2 |

*Primary Examiner*—Arnold Rosenthal
*Attorney, Agent, or Firm*—Arnold, White & Durkee

[57] ABSTRACT

A fluid valve apparatus having a stationary semicylindrical member through which a fluid port extends is characterized by a valve band which is flexibly movable from a first, closed, to a second, open, position in response to an actuating force. In the closed position, the flexible valve band is pulled taut about the surface of the cylindrical member and covers the fluid port. When closed, the valve band is subjected to a compressive force on the first surface thereof adjacent to the stationary cylindrical member and a tensile force on a second surface thereof. While in the open position, in which the fluid port is uncovered, the flexible valve band is subjected only to a tensile force tangentially directed relative to the surface of the cylindrical member. A rocker actuating member is operably connected to the flexible valve band and transmits an actuating force thereto by pivoting about a pivot point instantaneously defined by the intersection of the tangential direction of the tensile force on the flexible valve band and a second direction tangentially disposed relative to the surface of the cylindrical member.

4 Claims, 16 Drawing Figures

LOW ACTUATION FORCE FLUID VALVE APPARATUS

BACKGROUND OF THE INVENTION

1. Field of the Invention

This invention relates to fluid valve apparatus and, in particular, to float actuated fluid valves.

2. Description of the Prior Art

It is well known in liquid dispensing systems that air eliminators may be employed to automatically remove air or other gases entrained within a flowing stream of liquid. It is necessary to remove such gases from the liquid flow in order to prevent erroneous readings of the actual volumetric flow of the liquid taken by a metering apparatus that is usually connected downstream of the fluid valve assembly.

A typical example of prior art eliminators for removing air from a liquid petroleum dispensing system is the valve apparatus shown in U.S. Pat. Nos. 3,536,091 and 3,536,099 to C. D. Erickson, both of which are assigned to the assignee of the present invention. The prior art valve apparatus as exemplified by the above-mentioned patents includes first and second cylindrical valve members, one of which is mounted in a stationary position within a valve housing and the second of which is rollably movable along the surface of the first. Suitable fluid ports are provided within the stationary cylindrical valve member. The cylindrical valve members are interconnected by first and second pairs of involuted, opposed bands which are fixed at their opposite ends to the cylindrical members. One pair of bands is connected to the stationary member and extends between the two members and around the generally opposite surface of the second cylindrical member so that while the first pair of bands are in a first position wrapped around the first cylindrical member, the fluid ports are covered thereby. The second pair of bands extends in the opposite direction between the two cylindrical members. Relative rolling movement between the two cylindrical members causes the opposed pairs of flexible bands to inversely engage the surfaces of the members. That is, the pair of bands which in the closed position covered the fluid ports is unwrapped or peeled from the first cylindrical member and wrapped about the second cylindrical member as the cylindrical members are rolled relative to one another. Simultaneously, the second pair of flexible bands, initially wrapped about the second cylindrical member, is unpeeled therefrom and is wrapped in engaging contact with the first cylindrical member.

Although the prior art valves were effective for the purpose provided, particular care had to be given to the selection of materials utilized for the flexible bands and especially to the material's strength properties. Such care is required because the bands, as they are rolled and unrolled from one cylindrical valve member to another, experience a reverse bending stress. That is, the portions of each band which are initially subjected to a compressive load are quickly unloaded and then immediately subjected to a tensile load. Conversely, portions of the bands which are initially loaded with a tensile force are quickly unloaded and immediately subjected to a compressive load. This rapid change in the stresses imposed upon the flexible bands has a tendency to cause premature fatigue failure unless proper precautions, such as the use of an appropriate material of an appropriate thickness, are taken to insure the long-term viability of the flexible bands. Of course, such precautions are expensive.

The prior art fluid valves also are characterized by their excessive complexity, due to the provision of the support structure necessary for facilitating the rolling movement of one cylindrical member relative to the other. Further complexity is entailed in prior art valves by the necessity of providing biasing members which provide a variably compensating bias force on the band members to stretch the bands taut over the cylindrical surfaces of the valve members.

It is advantageous, therefore, to provide a fluid valve apparatus in which flexible bands are tautly stretched in tension about a cylindrical surface of a stationary valve member. It is of further advantage to provide a fluid valve apparatus in which flexible valve bands are not subject to reverse bending stresses as the bands are moved from a first, closed, to a second, open, position. It also is advantageous to provide flexible guide bands which similarly are not subject to reverse bending stresses as these bands move from a first to a second position. It is also advantageous to provide a valve that is less costly from a material and manufacturing viewpoint. It is of even further advantage to provide a valve apparatus wherein the operating life expectancy of fluid valve apparatus is increased due to the elimination fatigue stress imposed upon the bands.

It is advantageous to provide a less complex and more streamlined fluid valve actuating structure which utilizes an actuation geometry different from than the actuation geometry of the prior art. It is also advantageous to provide an actuating member in the form of a rocker member which is pivotally movable relative to a stationary cylindrical valve member and which pivots thereabout in response to an actuating force to move flexible valve bands from a first, closed, to a second, open, position.

SUMMARY OF THE INVENTION

This invention relates to a fluid valve apparatus which includes a stationary cylindrical member disposed within a valve housing. The stationary cylindrical member has a pair of fluid ports extending therethrough. First and second flexible valve bands are each mounted at the first lateral edge of the stationary cylindrical member and are flexibly movable relative thereto from a first, closed, position to a second, open, position. If the first, closed, position, the first and second flexible valve bands are stretched tautly about the surface of the cylindrical member and are disposed adjacent to, in contact with, and oriented on the fluid parts so as to completely cover the same. While in the first, closed, position, a portion of the surface of each of the first and second flexible valve bands adjacent the cylindrical surface of the stationary member are loaded with a compressive force, while the portion of the bands away from the cylindrical surface of the stationary member are loaded with a tensile force. As the bands move from the closed to the open position to uncover the fluid ports, each of them is subjected only to a tensile force tangentially directed relative to the surface of the stationary cylindrical member.

A flexible guide band is connected at the second lateral edge of the stationary cylindrical member and is moveable from a first position to a second position. A flexible bias band is interlocked between the flexible guide band and the cylindrical member. In the first position, the guide and bias bands are loaded with a tensile force directed tangentially to the surface of the cylindrical member. The guide and bias bands are movable from the first position to a second position in which the bands are adjacent to the surface of the stationary cylindrical member and stretched tautly thereover. While in the second position, the guide and bias bands are subjected to a compressive force in that portion of the bands close to the surface of the stationary cylindrical member while the portion of the bands away from the surface of the stationary cylindrical member are loaded by a tensile force.

A rocker actuating member having curved first and second ends is connected at those respective ends to the valve bands and the guide band. The rocker actuating member transmits an actuating force to the valve bands and the guide bands to actuate flexible movement thereof from their respective first positions toward their respective second positions. The rocker actuating member is pivotally movable relative to the stationary cylindrical member about a pivot point instantaneously defined by the intersection of the tangential direction of the forces imposed on the valve bands as the valve bands move from the closed to the open position and the tangential direction of the forces imposed on the guide band as the guide band moves from the first to the second position. The rocker actuating member is a substantially T-shaped member having the lower end of the leg of the T and the upper edge of the crossbar of the T curved underneath the body thereof and toward each other. Thus, an involute shaped actuator member is provided, the opening of the involute facing the cylindrical surface of the stationary member.

The fluid ports are each shaped to have a first end with a transverse dimension less than the transverse dimension of the second ends thereof. The narrower first ends of the fluid ports are disposed in the stationary cylindrical member so as to be the ends first exposed to the interior of the valve housing as the flexible valve bands move away from the surface of the cylindrical member in response to an actuating force transmitted thereto.

BRIEF DESCRIPTION OF THE DRAWINGS

This invention will be more fully understood from the following detailed description of a preferred embodiment thereof taken in connection with the accompanying drawings in which.

DESCRIPTION OF THE PREFERRED EMBODIMENT

Throughout the following description, similar reference numerals refer to similar elements in all figures of the drawings.

Figure 1:
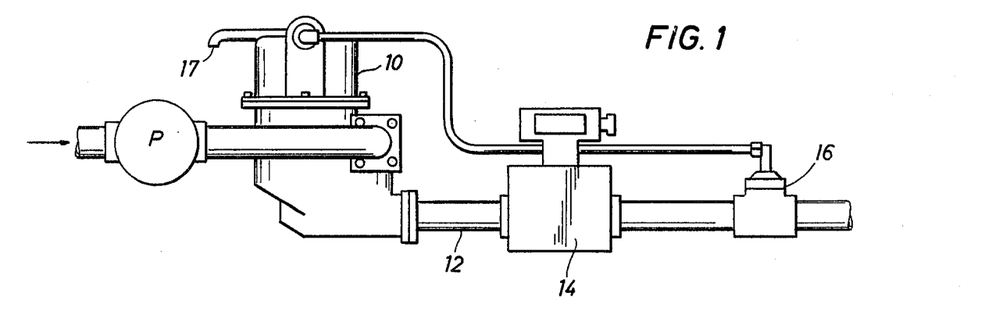
FIG. 1 is a elevational view of a fluid valve apparatus embodying the teachings of this invention and disposed within a liquid flow metering line.

Referring to the drawings, and particularly to FIG. 1, a fluid valve apparatus 10 embodying the teachings of this invention is shown in a typical environment of a liquid petroleum flow system. The liquid petroleum flow system includes a flow line 12 incorporating a meter 14 which records the volumetric flow of liquid through the line. The fluid valve apparatus 10 is interconnected upstream of the meter 14 and is adapted to remove gaseous fluids, such as air or other entrained gases, which may be present in the flowing petroleum liquid before the entry of the liquid into the meter 14. The fluid valve apparatus 10 may include a strainer element. Also, if desired, the fluid valve assembly 10 may be interconnected to actuate a pilot valve 16 to control the flow of liquid pumped through the flow line 12.

As discussed above, the fluid valve apparatus of the prior art utilizes inversely coupled pairs of flexible bands to control the communication of fluid ports with the interior of the valve. One pair of flexible bands controls the opening of the fluid ports while the second pair of flexible bands serves to guide a movable cylindrical valve member as that member rolls with respect to a stationary valve member. The rolling of one cylindrical valve member relative to the other imposes reverse bending stresses upon the flexible bands.

Figure 2A:
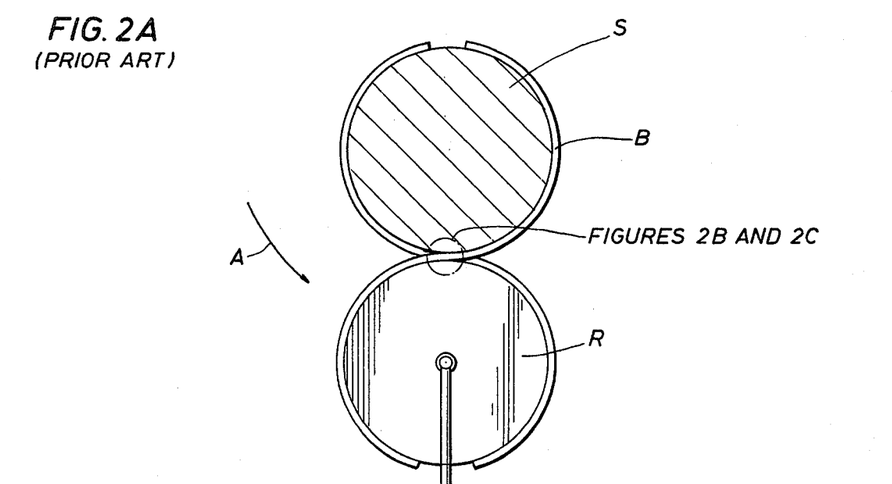
FIGS. 2A–2C are diagrammatic views illustrating the stress loadings on flexible valve bands utilized in prior art fluid valve apparatus.
Figure 2B:
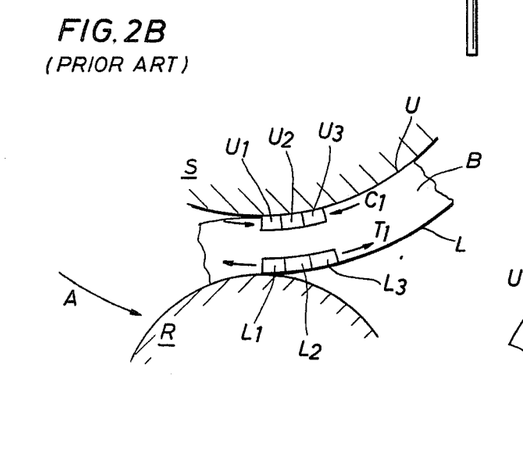
Figure 2C:
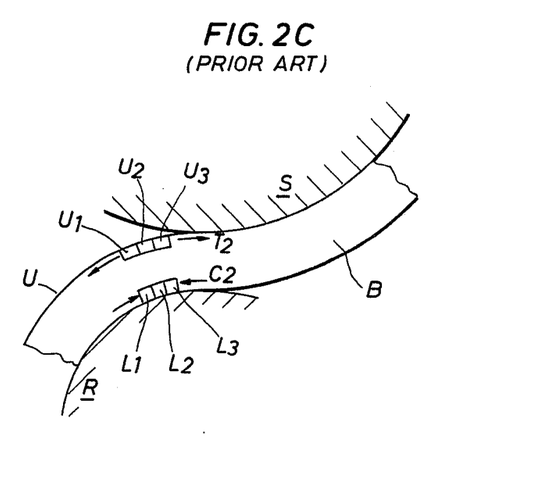

Referring to FIGS. 2A–2C, diagrammatic illustrations of the stress loading of a flexible band utilized in prior art fluid valve apparatus are shown.

In FIG. 2A, a stationary cylindrical valve member S and a rollably movable cylindrical valve member R are disposed relative to each other as shown. The stationary cylindrical member S and the movable cylindrical member R have provided therebetween the resilient band B connected as required by prior art fluid valve apparatus. That is to say, the band is coupled to the cylindrical members S and R so that as the movable cylindrical member R moves in the direction of the arrow A about the surface of the stationary valve member S, the band B is peeled from the surface of the stationary valve member S and rolled onto the surface of the rollable valve member R.

With reference to FIG. 2B, an expanded view of the circled portion of FIG. 2A, showing the stress loadings on the fibers of a portion of the band B, is illustrated. As seen in FIG. 2B, the flexible band B has an upper surface U which is contacted against the surface of the cylindrical valve member S while the band B is in the closed position thereon. Also, while in the closed position, the lower surface L of the flexible band B is disposed away from the surface of the member S. While the flexible band B is in the closed position with its upper surface U in contact with the surface of the stationary member S, a portion of the fibers of the material of the band B beneath the surface U thereof, illustrated in FIG. 2B as $U_1$, $U_2$, $U_3$, are shown as being subjected to a compressive loading, as illustrated by the arrows C, acting at the ends of the fibers U. Simultaneously, however, the fibers of the flexible band B adjacent the lower surface L thereof, indicated by reference characters $L_1$, $L_2$, and $L_3$, are subjected to a tensile stress, as indicated by the arrows $T_1$, acting at the ends of the fibers L.

However, as the rollable valve member R, moving in the direction of arrow A, peels the flexible band B from the surface of the stationary valve member S onto the surface of the rollable valve member R, it may be appreciated with reference to FIG. 2C that the fibers in the upper surface U of the flexible band B, namely $U_1$, $U_2$, and $U_3$, are compressively unloaded and immediately subjected to a tensile force, as indicated by arrows $T_2$. Simultaneously, the fibers $L_1$, $L_2$, and $L_3$ on the lower surface L of the flexible band B are tensilely unloaded and immediately subjected to a compressive load, as indicated by arrow $C_2$. It may be appreciated that as the flexible band B is moved from rollable valve member R back onto the surface of the stationary valve member S, the fibers in the upper and lower surfaces of the flexible band B again undergo a similar reverse bending stress. It may also be appreciated that the repeated cyclic imposition of stresses from, for example, tensile to compressive to tensile, experienced by the fibers of the flexible band B, may result in premature fatigue failure thereof.

Figure 3A:
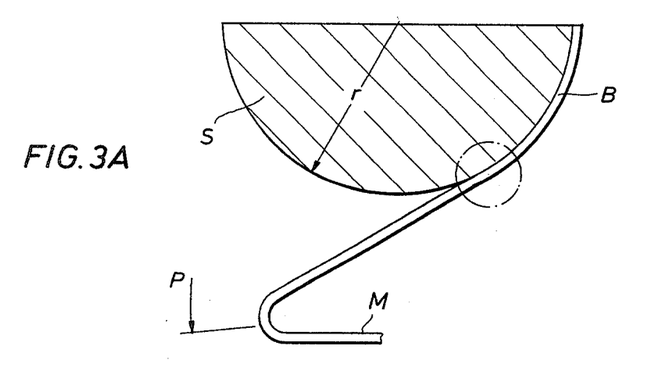
FIGS. 3A–3C are diagrammatic views, similar to those of FIG. 2, illustrating the stress loadings on flexible valve bands utilized a a fluid valve apparatus embodying the teachings of this invention.
Figure 3B:
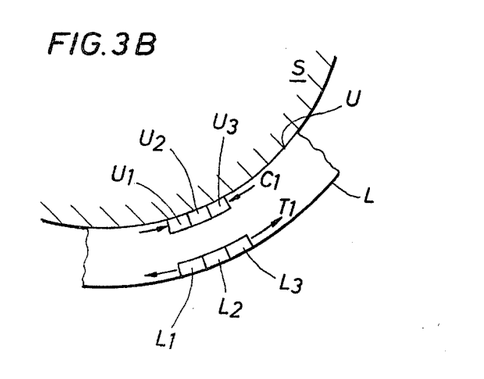
Figure 3C:
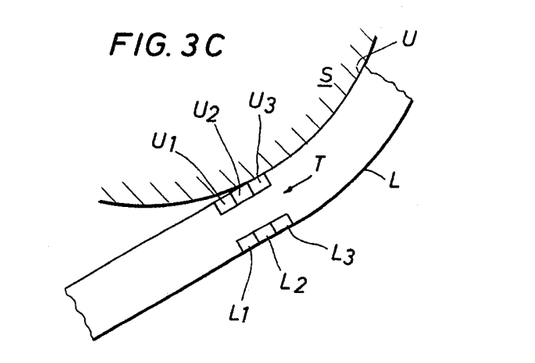

With reference to FIGS. 3A-3C, diagrammatic illustrations of the stress loading of a flexible band utilized in a fluid valve apparatus embodying the teachings of this invention are shown.

In FIG. 3A, the stationary valve member S is shown as the flexible band B is unwrapped therefrom as the valve actuating member M pivots in a direction P in a manner which is explained more fully herein. As seen in FIG. 3B, which is a diagrammatic view similar to that shown in FIG. 2B, the upper surface U of the flexible band B is shown as having the fibers $U_1$, $U_2$, and $U_3$ again subjected to a compressive force indicated by arrows $C_1$ as the upper surface U of the flexible band B is contacted against the surface of the stationary valve member S. At the same time, the fibers $L_1$, $L_2$, and $L_3$ of the lower surface L of the flexible band B are subjected to a tensile force indicated by arrows $T_1$. With reference to FIG. 3C, it is seen that as the flexible band B is moved out of contact with the surface of the stationary valve member S, the fibers on the upper and lower surfaces U and L, respectively, of the flexible band B are subjected only to a uniform tensile stress acting in the direction $T_2$. Thus, it may be appreciated that the fibers adjacent the upper surface U of the flexible band B are subjected only to a change in stress from compressive to tensile and the fibers in the portion of the flexible band B near the lower surface L experience no change of stress. It also may be appreciated that the flexible band B undergoes no reverse bending stresses whatsoever. This, together with an increased bending radius $r$ of the stationary valve member S, may be expected to produce a valve having a longer operating life and a lesser possibility of premature fatigue failure than prior art valves. Further, significantly thicker bands may be utilized, to enable the valve to withstand pressures higher than those withstood with prior art valves, due to the increased bending radius $r$ and the reduced stresses imposed on the bands.

Figure 4:
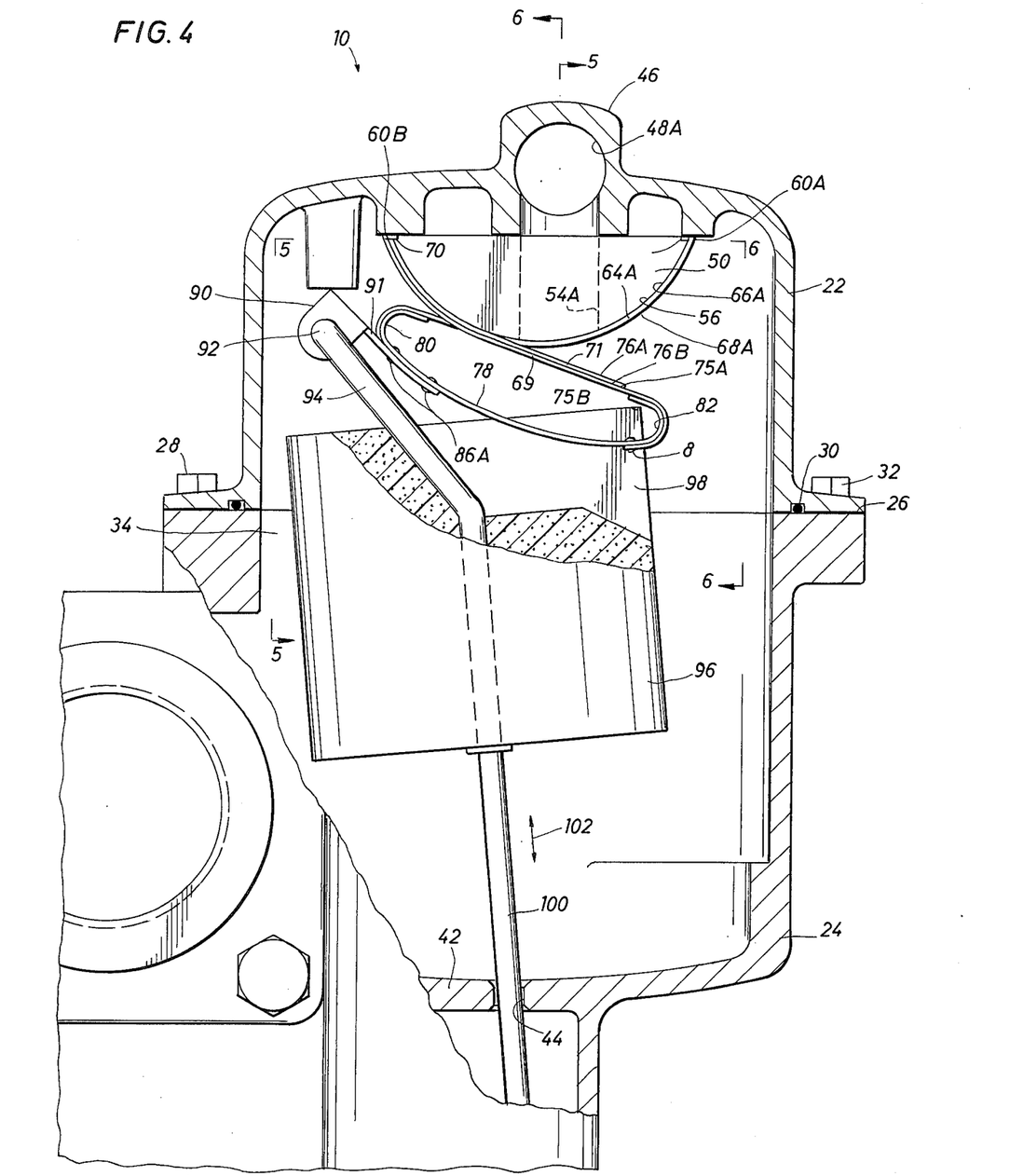
FIG. 4 is a sectional view of a fluid valve apparatus embodying the teachings of this invention, showing the valve in the closed position.
Figure 5:
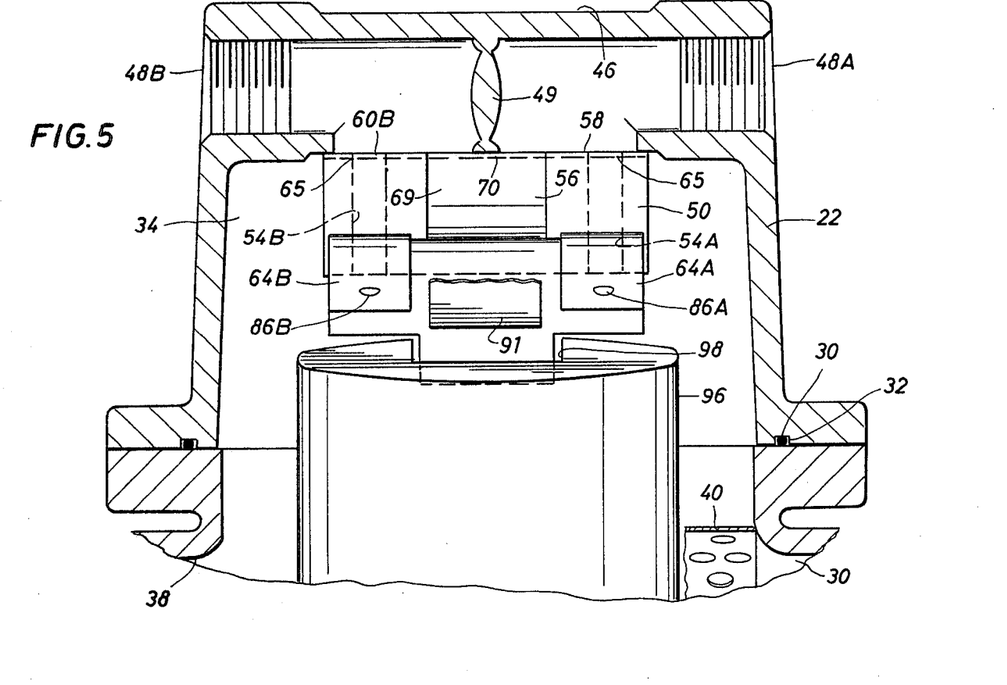
FIG. 5 is a sectional view of a fluid valve apparatus embodying the teachings of this invention and taken along section lines 5—5 of FIG. 4.
Figure 6:
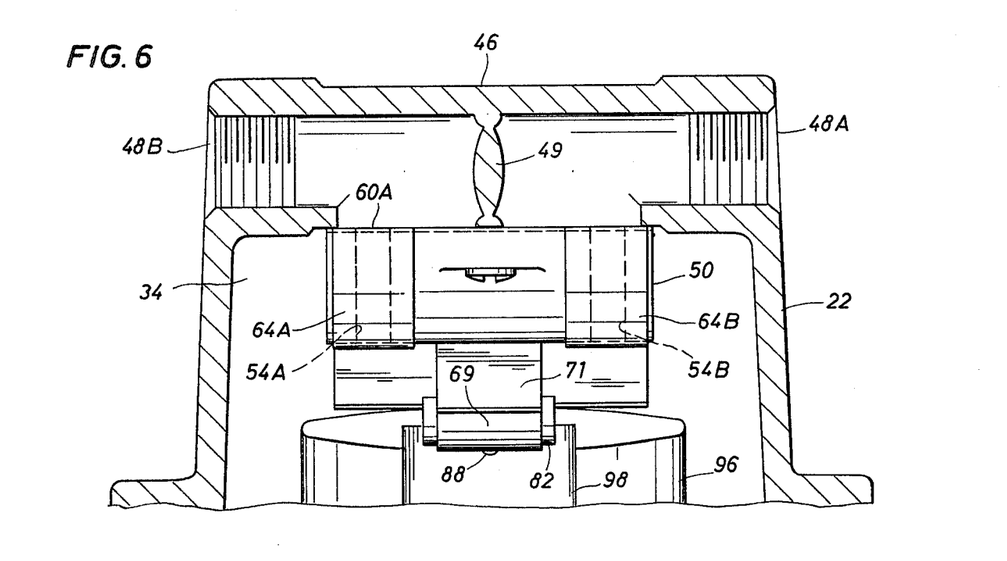
FIG. 6 is a sectional view of a fluid valve apparatus embodying the teachings of this invention and taken along section lines 6—6 of FIG. 4.

Referring now to FIGS. 4, 5, and 6, shown are sectional views of a fluid valve apparatus 10 embodying the teachings of this invention. The valve apparatus 10 comprises a valve housing fabricated of a cover member 22 and a base member 24 joined together along horizontal planar mating surfaces 26 and securely fastened by suitable fastening means, such as bolts 28. A suitable packing, such as an O-ring seal 30, is disposed within an annular recess 32 provided in the cover member 22 to insure a fluid-tight seal between the conjoined cover and base. The interior of the cover and the base cooperate to define a valve chamber 34 which communicates with the fluid flow line 12 (FIG. 1) through an inlet port 36 and an outlet port 38. A strainer element 40 may be disposed within the valve chamber 34 adjacent the inlet port 36 in a manner well known to those skilled in the art. The lower base member 24 provides a flange 42 having an opening 44 therein, the flange 42 extending within the valve chamber 34 and provided for a purpose which will become clearer herein.

The cover member 22 includes a crown portion 46 through which extend fluid flow passages 48A and 48B. The passages 48 are separated by a removable central partition 49 of the knock-out type provided within the crown 46 and may be connected as desired to an exhaust 17 and to the pilot valve 16 (FIG. 1), or may be singly connected to the exhaust 17 after the central partition 49 is removed and one port plugged. It is understood, of course, that with appropriate modifications, such as a suitable change in valve head or crown portion, a valve embodying the teachings of this invention may be utilized to provide a discharge of gaseous fluid to any predetermined region or directly to atmosphere.

Disposed within the valve chamber 34 is a stationary semicylindrical member 50. Suitable fluid ports 54A and 54B are provided within the stationary member 50 in fluid communication with the fluid flow passages 48A and 48B, respectively. The cylindrical member 50 has a semicylindrical surface 56 and a substantially planar surface 58 thereon, the planar surface 58 being provided with first and second lateral edges 60A and 60B, respectively. As seen in the figures, the planar surface 58 of the stationary cylindrical member 50 is suitably attached within the valve chamber 34. It is, of course, understood that the member 50 may be any conveniently shaped member which has thereon an arcuate surface, including, but not limited to, a cylindrical surface.

First and second flexible valve bands, indicated by reference numerals 64A and 64B respectively, cooperate to act as a pair of fluid port closure members. The valve bands 64A and 64B are fabricated of a flexible material such as spring steel, although it is understood that other suitable materials may be used. The first and second flexible valve bands 64A and 64B are each attached at a first end thereof to the first lateral edge 60A of the stationary cylindrical member 50. The bands 64A and 64B have respective first surfaces 66A and 66B and second surfaces 68A and 68B thereon. In the closed position illustrated in FIGS. 4, 5, and 6, the bands 64A and 64B are disposed so as to contact their respective upper surfaces 66A and 66B with the semicylindrical surface 56 of the stationary member 50 to completely block the corresponding fluid ports 54A and 54B. The bands 64A and 64B are flexibly movable from the first, closed, position illustrated in FIGS. 4, 5, and 6 to a second, open, position in which they are tangentially oriented with respect to the semicylindrical surface 56. When the valve 10 is in the open position, the flexible valve bands 64A and 64B are disposed as illustrated in FIG. 8.

As discussed in connection with FIG. 3, while the flexible valve bands 64A and 64B are in the closed position covering the fluid ports 54A and 54B, portions of the bands 64A and 64B adjacent the upper surfaces 66 thereof are under compressive loading, while a portion of the flexible bands 64A and 64B adjacent the lower surface 68 is under a tensile load. However, as the flexible valve bands 64A and 64B are moved away from the stationary cylindrical member 50, the bands 64A and 64B are subjected only to a stress directed tangentially relative to the surface 56 of the stationary cylindrical member 50.

A guide band, indicated by reference numeral 69, is connected at a first end thereof to the second lateral edge 60B of the stationary cylindrical member 50, as at 70. The guide band 69 may be fabricated of a flexible material identical to that used in fabricating the valve bands 64, although it is understood that any other suitable material may be used. As best seen in FIG. 6, the flexible guide band 69 is connected substantially centrally to the lateral edge 60B of the member 50. As seen best in FIG. 5, the first and second flexible valve bands 64A and 64B are connected substantially at the ends thereof adjacent the first lateral edge 60A. A bias band 71, or flat support spring, is interlocked between the guide band 69 and the member 50, the bias band 71 being disposed radially inward of the guide band 69, relative to the stationary cylindrical member 50. It is noted that the purpose of the guide band 69 is to provide a guiding force within the valve 10 during the actuation sequence thereof. The bias band 71 determines the actuating force characteristic of the valve and provides a counterbalancing force during the actuation sequence of the valve. The actuating force characteristic may be altered by changing the spring constant of the bias band 71. The bias band 71 may be fabricated of a flexible material such as hard, corrosion-resistant spring steel, although other materials may be used. It is also within the contemplation of this invention to dispose only a single guide band fabricated of a material of suitable thickness and flexibility so as to effectively guide and counterbalance the first and second valve bands 64A and 64B. Of course, any other suitable disposition of the guide band 69 to serve as a counteracting force to the flexible bands 64A and 64B is also within the contemplation of this invention.

Figure 8:
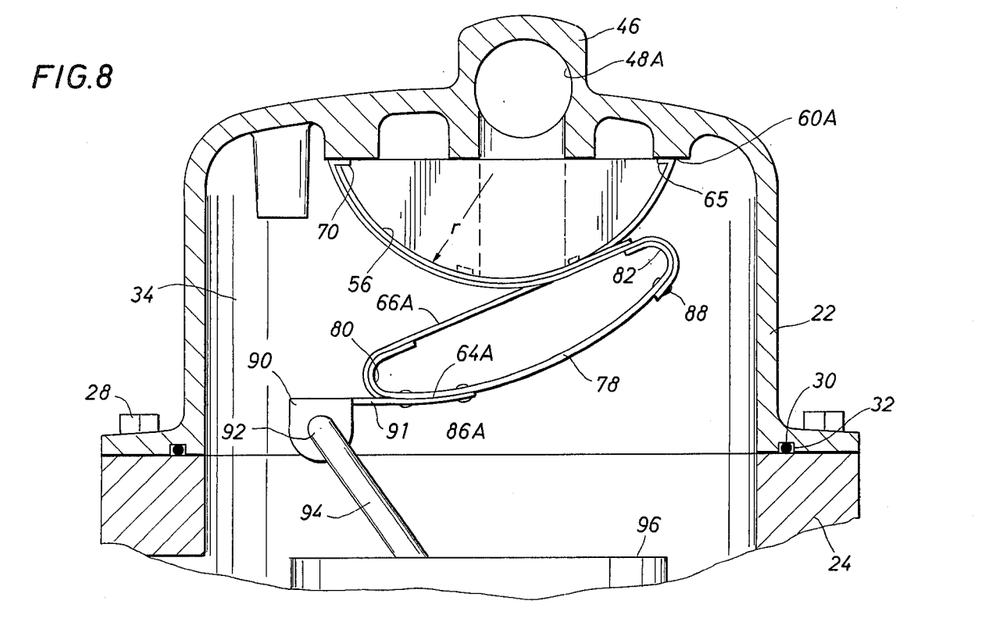
FIG. 8 is a sectional view, similar to FIG. 4, showing a fluid valve apparatus embodying the teachings of this invention in the open position.

As seen in the figures, the guide band 69 and the bias band 71 are flexibly movable from a first position shown in FIGS. 4, 5, and 6 to a second position illustrated in FIG. 8. Similar to the situation concerning the valve bands 64A and 64B, the guide band 69 and the bias band 71 have, respectively, upper surfaces 75A and 76A and lower surfaces 75B and 76B, respectively, thereon. The guide bands 69, while in the first position illustrated in FIGS. 4, 5, and 6, has the fibers adjacent the upper surface 75A and lower surface 75B thereof loaded only by a tensile force directed substantially tangentially to the semicylindrical surface 56 of the stationary member 50. The bias band 71 is not subjected to a tensile force. However, when the guide band 69 and the bias band 71 are in the closed position illustrated in FIG. 8, a portion of the fibers of the guide band 69 near the upper surface 75A is subjected to a compressive force while a portion of the fibers of the guide band 69 adjacent the lower surface 75B thereof are subjected to a tensile force. The bias band 71 is subjected to similar bending stresses adjacent its upper surface 76A and lower surface 76B.

Figure 7:
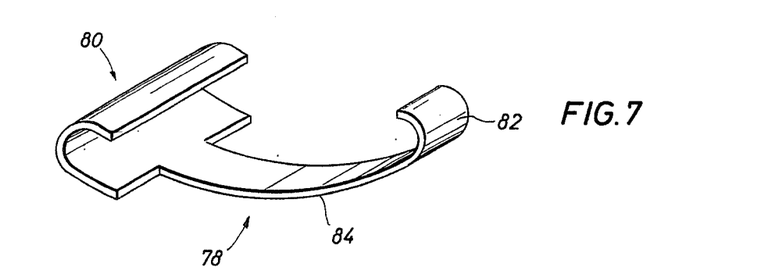
FIG. 7 is a perspective view of a rocker actuating member utilized in a fluid valve apparatus embodying the teachings of this invention.

As seen in FIGS. 4, 5, and 6 and shown in a perspective view in FIG. 7, a rocker actuating member 78 is a substantially T-shaped member having a first end 80 disposed at the edge of the crossbar of the T and a second end disposed at the leg of the T. Prior to installation, the T-shaped member is unloaded and is substantially straight along the body portion thereof. However, when installed into the assembled relationship shown in the figures, the member 78 bends, as at 84, due to the displacement between the valve bands and the guide band to tension these bands. As seen best in FIG. 7, the ends 80 and 82 of the T-shaped actuating member 78 are curved toward each other underneath the body of the actuating member 78 so as to define thereby a substantially involute shaped actuating member. It may be seen that the opening of the involute faces the cylindrical surface 56 of the stationary semicylindrical member 50 when the actuating member 78 is disposed in the described assembled relationship. The actuating member 78 may be fabricated of any suitable material such as spring steel although it is understood that other suitable materials may be used.

It is also to be understood that the actuating member 78 may be a member that remains substantially flat when installed to directly support the flexible bands and remain within the teachings of this invention. That is, even with a flat actuating member (as installed), the elimination of reverse bending stresses on the flexible bands may be effected. Further, it is understood that the opening of an involute actuating member 78 may face away from the semicylindrical member 56, so long as the actuating forces are transmitted to the actuating member at one end thereof. In this manner, the distance between the point of application of the actuating force to the actuator and the point where the bands leave the surface of the member 50 changes. It is noted that in the prior art, the distance between the actuating point and the point where the bands leave the surface of the stationary member is a constant, radial distance.

As seen in FIGS. 4, 5, and 6, the first and second flexible bands 64A and 64B are attached at their second ends to the first end 80 of the actuating member 78, adjacent the cross-bar of the T, by suitable fastening means 86, such as pin fittings. The guide band 69 is attached at its second end to the second end 82 of the actuating member 78 adjacent the leg of the T by suitable fastening means 88, such as pin fittings. As stated above, the bias band 71 is interlocked between the guide band 69 and the member 50.

An actuator connector 90 is fastened to the first end 80 of the actuator member 78 by a connecter plate 91 secured to the actuator 78 the fastening means 86. Pivotally mounted within an opening 92 in the actuator connector plate 91 is a bent guide arm 94. The guide arm 94 is connected pivotally at its second end to a float member 96. To achieve the most compact overall design, the guide arm 94 is shaped to interlock with a cut-out 98 (best seen in FIG. 5) within the float 96. The cut-out 98 provides clearance for the T-shaped member 78 when the valve is in the closed position illustrated in FIGS. 4, 5, and 6. The float 96 is received within the valve chamber 34 and responds to the level of fluid therein intermediate between the inlet port 36 and the outlet port 38. The guide arm 94 extends through the float 96 and is received within the opening 44 provided within the flange 42. The cooperation of the guide arm 94 and the flange 42 maintain the reactions of the float 96 to the fluid level within the chamber 34 to rectilinear motion of the float 96 along a substantially, but not necessarily, vertically directed axis 102.

As seen in the figures, the flexible valve bands 64A and 64B are movable in response to an actuating force transmitted thereto from a first, closed position shown in FIGS. 4, 5, and 6, in which the bands contact the semicylindrical surface 56 of the stationary cylindrical member 50, to a second open position in which the flexible valve bands 64A and 64B extend tangentially relative to the surface 56 of the stationary cylindrical member 50, the open position being illustrated in FIG. 8. Similarly, the flexible guide band 69 and the bias band 71 are also flexibly movable from a first position illustrated in FIGS. 4, 5, and 6, wherein the bands are disposed tangentially relative to the surface 56 of the stationary cylindrical member 50, to a second position illustrated in FIG. 8 in which the guide band 69 and the bias band 71 are adjacent to and in contact with the semicylindrical surface 56 of the stationary member 50.

Actuating forces are transmitted to the valve bands 64A and 64B and guide bands 70A and 70B by the actuating member 78. The actuating member 78 itself responds, through its connection by the guide arm 94 with the float 96, to movements of the float 96 in the direction 102 to correspond to the level of fluid within the lower portion of the chamber 34. The actuating member 78 is pivotally disposed relative to the stationary cylindrical member 50. The response of the actuating member 74 as it transmits actuating forces to the flexible valve bands 64 and the flexible guide band 71 is best understood in relation to FIGS. 9A and 9B, which are diagrammatic views of the pivotal response of the actuating member 78.

Figure 9A:
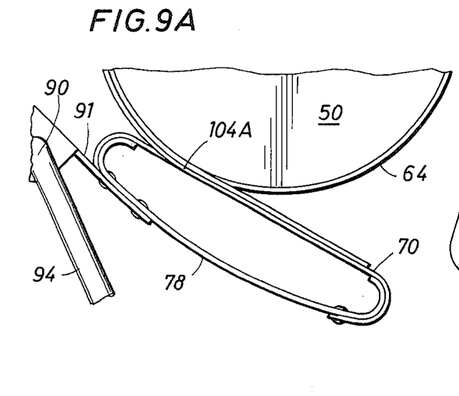
FIGS. 9A and 9B are diagrammatic views of the pivotal response of the actuating member of a fluid valve apparatus embodying the teachings of this invention.

As seen in FIG. 9A, with the flexible valve bands 64 in the closed position and tautly stretched over the semicylindrical surface 56 of the stationary member 50, the guide bands 70 are disposed substantially tangentially to the surface 56 of the stationary member 50. If the fluid flow passing through the valve 10 contains an entrained gaseous element, such as air, the level of liquid in the chamber 34 will be lowered, and the float 96 responds thereto by moving downwardly within the chamber 34 along the axis 102. A downward movement of the float 96 is transmitted to the actuating member 78 through the guide arm 94. The actuating member begins its pivotal response to the actuating force, and its transmission of the actuating force to the flexible valve bands 64 and the flexible guide band 69, by pivoting about a pivot point 104A. It may be seen that the pivot point 104A is instantaneously defined by the intersection of the tangents of the flexible valve bands 64 and the flexible guide band 69 as those bands leave contact with the stationary member 50. As the actuating force of the float 96 in the direction 102 continues, and as viewed in FIG. 9B, the actuating member 78 continues to pivot about the pivot point 104B again instantaneously defined as the intersection of the tangents defined by the flexible valve bands 64 and the flexible guide band 69 as those bands leave contact with the stationary member 50.

Figure 9B:
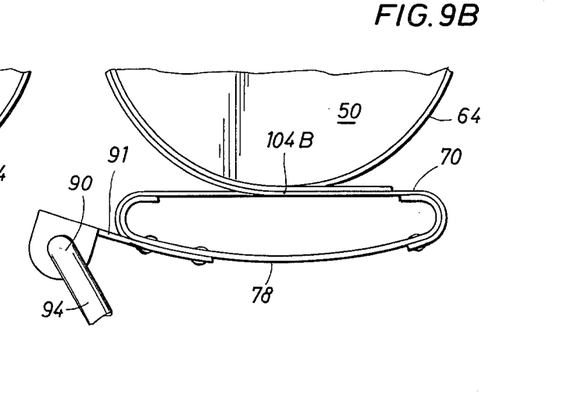

In summary, it may be appreciated that the actuating member 78 pivots relative to the stationary cylindrical member 50 about a pivot point 104 which is instantaneously defined by the intersection of the tangents formed by the flexible valve bands 64 and the flexible guide band 69 as those bands leave contact with the stationary member 50 to move from their respective first toward their respective second positions.

It is further appreciated that the actuating member 78 is affixed to the float 96 (through the guide arm 92) so that the distance between the attachment point 92 and the instantaneous pivot point 104 (FIG. 9) is changing as the bands 64 and 70 are opened and closed. This is contrasted to the prior art valves wherein the actuating point of the roller R is at all times a radial constant distance from the point of reverse bending stress. It is, of course, appreciated that locating the actuation point at one end 80 of the actuating member 78 has the advantageous result that the distance between the point of application of the actuating force (end 80 of the member 78) and the last contact point of the band to the surface (the instantaneous pivot point 104) changes as the valve opens or closes.

Further, it is noted that even if the opening of the involute of the actuating member 78 is directed away from the surface of the cylindrical member 50, disposing the actuating member at one end 80 of the actuator 78 has the salutory effects of limiting (although not totally eliminating) the reverse bending stress in the valve and guide bands, and of lessening the actuating force requirements.

Figure 10:
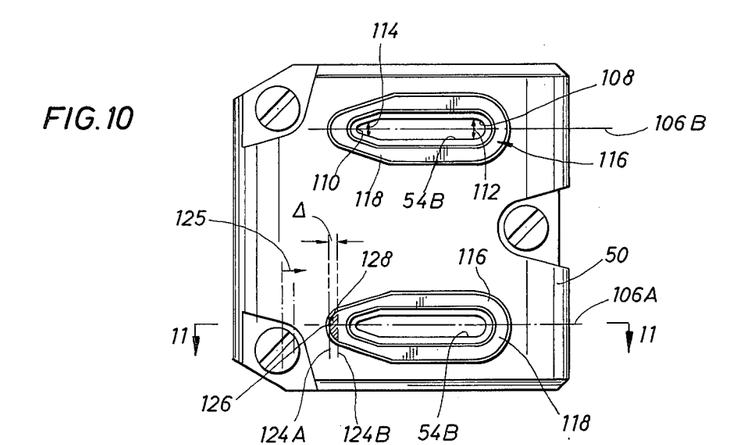
FIG. 10 is a view of fluid flow ports defined within a fluid valve apparatus embodying the teachings of this invention taken along lines 10—10 in FIG. 5; and, FIG. 11 is a sectional view of a fluid flow port of a valve appartus embodying the teachings of this invention taken along section lines 11—11 of FIG. 10.
Figure 11:
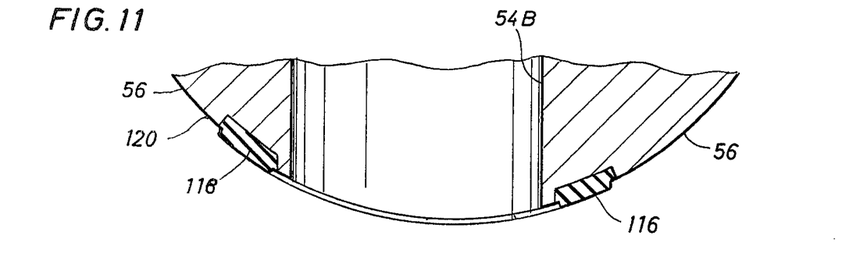

As the flexible valve bands 64 peel from the stationary cylindrical member 50, the fluid ports 54A and 54B are exposed to permit venting of the gaseous fluid entrained within the liquid passing through the valve 10, the vented fluid carried through flow passages 48A and 48B. With reference to FIGS. 10 and 11, views of the fluid ports 54 embodied within a fluid valve apparatus 10 embodying the teachings of this invention are disclosed. As seen in FIG. 10, the fluid ports 54A and 54B are openings extending through the stationary cylindrical member 50, having respective longitudinal axes 106A and 106B extending substantially circumferentially relative to the stationary cylindrical member 50. It is also seen from FIGS. 10 and 11 that the fluid ports 54A and 54B each have a first end 108 and a second end 110, the transverse dimension 112 (relative to the axis 106) of the ends 108 being greater than the transverse dimension 114 (relative to the axis 106) of the ends 110. It may be appreciated that a narrower V-shaped end 110 is defined and that the narrow ends 110 of the fluid ports 54 are therefore the first portion of the ports 54 exposed to the chamber 34 as the flexible valve bands 64 move from the surface 56 of the stationary cylindrical member 50.

As seen in FIGS. 10 and 11, the periphery of the ports 54A and 54B are provided with a resilient seal member 116. The seal 116 has a raised portion 118 which extends above the surface 56 of the cylindrical member 50 for a predetermined distance, indicated in FIG. 11 as 120. With reference to FIGS. 9, 10 and 11, it may be appreciated that as flexible valve bands open in response to the actuating force transmitted to one end of the actuating member 78, the instantaneous pivot point 104 (FIG. 9) projects onto the view of FIG. 10 as a line 124 incrementally advancing from left-to-right in the direction of arrow 125.

When the valve bands are closed, and metal-to-metal contact exists between the valve bands and the surface of the member 50, it is appreciated that the chamber 34 may become pressurized. It is desirable to provide a seal arrangement for the valve bands which permits the bands to open against a high chamber pressure with a minimum actuation force. The shape of the resilient seals 116 provides a seal arrangement which permits this to occur.

With the valve bands closed, the pressure within the chamber 34 acts on the surface of the valve bands exposed to the chamber 34 to depress the raised portion 118 of the seal 116. It is seen that as the bands open, the line 124 (the projection of the pivot point 104) may be envisioned as incrementally advancing from left-to-right across FIG. 10 as the pivot point 104 (FIG. 9) instantaneously moves across the surface 56 of the member 50. At one point in the opening sequence of the bands, the line 124A passes through the point 126, the left-most end of the raised portion 118. Continued opening of the valve bands will later dispose the line 124B a predetermined distance Δ to the right of the intersection of the line 124A and the point 126.

At this time, due to the relaxation of the forces on the raised portion 118 of the seal 116 between lines 124A and 124B, the seal 116 has resiliently expanded to its height 120, (FIG. 11). However, contact still is maintained between the interior surface of the valve band and the extended height of the seal. It may be appreciated that for further opening of the valve bands to occur, an actuation force must be imposed on the actuator 78 which is at least equal to the force of the pressure acting over the area still contacted between the raised portion 118 of the seal 116 and the interior of the valve band, the area being a substantially triangular area indicated by reference numeral 128 on FIG. 10. A valve embodying the teachings of this invention is provided such that the height 120 of the raised portion 118, the angularity of the legs of the substantially triangular shaped area 128, and the radius r of the member 50 (FIG. 8) cooperate to hold the actuating force necessary to continue opening the valve bands to a minimum. To minimize actuating force requirements, to maximize discharge area, and to minimize overall space requirements, a radius of less than 1.75 inches for the member 50, a height 120 in the range .005–.030 inches, and an included angle of less than 90° are typical values for the above discussed structural parameters. Of course, it is understood that the values recited above are typical examples, and dependent upon the circumstances, other values may be appropriate.

In summary, it may be appreciated that hereinabove described is a fluid valve apparatus provides a movable valve actuating member in which the distance between the point of application of the actuating force and the point at which flexible valve bands leave the surface of a cylindrical valve member changes throughout the opening and closing stroke to thus substantially lessen reverse bending stresses on the valve bands. It is also appreciated that a fluid valve apparatus is provided in which a pair of flexible valve bands are tautly stretched about a cylindrical surface to provide a substantially leak-tight seal. Further, a valve embodying the teachings of this invention provides a seal that is able to open with a minimum actuation force in the presence of high fluid pressure in the valve chamber. A fluid valve embodying the teachings of this invention also provides an actuating arrangement which eliminates totally reverse bending stresses imposed on the flexible bands used within the valve.

What is claimed is:

1. A low actuation force fluid valve apparatus comprising:
   a valve housing;
   a stationary member having an arcuate surface thereon mounted within said housing;
   a fluid port extending through said stationary member;
   a flexible valve band having a first and a second surface thereon flexibly movable from a first, closed, position to a second, open, position in response to an actuating force;
   a substantially T-shaped actuating member having the edge of the crossbar and the edge of the leg being curved toward each other under the body of the T, said flexible valve band being connected to one of the edges of the T-shaped member, said actuating member being pivotally movable relative to said stationary member to transmit an actuating force to said flexible valve band to move said flexible valve band from the first, closed, position to the second, open, position;
   said valve band in the first, closed, position having said first surface adjacent to the surface of said stationary member to cover said fluid port, said valve band being subjected to a compressive load on said first surface thereof and a tensile load on said second surface thereof while in the first, closed, position,
   said valve band in the second, open, position extending tangentially from the surface of said stationary member to uncover said fluid port, said valve band being subjected only to a tangentially directed tensile force while in the second, open, position; and,
   a flexible guide band having first and second surfaces thereon and being connected to the other edge of said T-shaped actuating member for movement in response to an actuating force from a first to a second position, connection of said T-shaped actuating member to said valve band and said guide band compressing said T-shaped member across its ends to generate a bend therein to impart a tensioning force to said valve band and said guide band;
   said guide band in the first position extending tangentially from the surface of said stationary member and being subjected only to a tangentially directed tensile force;
   said guide band in the second position having said first surface thereof disposed adjacent to the surface of said stationary member, said guide band being subjected to a compressive load on said first surface thereof and a tensile load on said second surface thereof while in the second position.

2. The low action force fluid valve apparatus of claim 1, wherein said actuating member is pivotable about a pivot point instantaneously defined by the intersection of the tangential directions of the tensile forces imposed upon said valve band and said guide band as those bands move from their respective first to their respective second positions in response to an actuating force transmitted thereto by said actuating member.

3. The low actuation force fluid valve apparatus of claim 1, wherein said fluid port has a first and a second end, the transverse dimension of said fluid port at said first end being less than the transverse dimension of said fluid port at said second end, said first end being disposed in said stationary cylindrical member so as to be the end of the fluid port first uncovered as said valve band moves from said first, closed, to said second, open, position.

4. The low actuation force fluid valve apparatus of claim 1 wherein said edge of said T-shaped actuating member to which said valve band is connected lies adjacent to said crossbar and wherein said other edge of said T-shaped actuating member to which said guide band is connected lies adjacent to said leg.

* * * * *

UNITED STATES PATENT OFFICE
CERTIFICATE OF CORRECTION

Patent No. 4,106,524          Dated August 15, 1978

Inventor(s) Walter G. Wunsch

It is certified that error appears in the above-identified patent and that said Letters Patent are hereby corrected as shown below:

Column 12, line 57, "action" should read --actuation--.

Signed and Sealed this

Third Day of April 1979

[SEAL]

Attest:

RUTH C. MASON
Attesting Officer

DONALD W. BANNER
Commissioner of Patents and Trademarks